UNITED STATES PATENT OFFICE 2,200,974

INK

Charles T. Walter, Chicago, Ill., assignor to Industrial Patents Corporation, Chicago, Ill., a corporation of Delaware No Drawing. Application August 15, 1936, Serial No. 96,246

5 Claims. (Cl. 134—36)

This invention relates to an improved ink.

One of the objects of the invention is to provide an improved ink for printing on the surface of natural casings prepared from animal intestines.

Other objects of the invention will be apparent from the description and claims which follow.

This application is a continuation in part of my application entitled Ink, Serial No. 53,617, filed December 9, 1935, which application, Serial No. 53,617, is a division of my application entitled Casing ink, Serial No. 23,669, filed May 27, 1935. My said application, Serial No. 23,669, issued September 15, 1936, as Patent No. 2,054,148.

It has been proposed from time to time to mark sausages by tags and by various other marks. Direct printing upon the surface of synthetic cellulose casings has been found to be successful in practice. Direct printing upon natural casings prepared from animal intestines is inherently fraught with difficulty due to the nature of the tissue.

The present invention provides an ink suitable for direct printing on animal casings which withstands wetting and processing in a remarkable manner. The ink of the present invention permits the printing to be done directly upon the surface of the casing, the printed characters being fixed to the surface of the casing by the presence of a protein precipitant as an ingredient of the ink.

I have found in practice that formaldehyde is an effective protein precipitant which is miscible with ordinary inks available for printing sausage casings and results in a product which gives satisfactory results.

The ink of the present invention may be prepared by first preparing a formula as follows, the percentages being indicated by wieght:

| | Per cent |
|---|---|
| Pigment (such as an oxide of titanium) | 60–65 |
| Fluid medium or menstruum | 40–35 |

The fluid medium, or fluid vehicle, which carries the pigments, preferably comprises:

| | Per cent |
|---|---|
| Waterproof spar varnish | 10–20 |
| Unsaponifiable waxy or greasy matter (for example 5 to 7 parts of paraffin and 100 parts of petroleum jelly) | 5–10 |
| Lithographic linseed oils (litho-oils) | 75–85 |

Any suitable spar varnish may be employed. Preferably a varnish known in the varnish trade as "long oil" China-wood varnish is used. For example, the varnish may comprise 25 gallons of a drying oil, preferably China-wood oil, to 100 pounds of a natural or synthetic resin, or a combination of such resins. Thus, ester gum, other natural gums, or synthetic gums, such as potentially reactive phenol-condensation products may be employed.

A suitable waterproof spar varnish may be used in accordance with the specifications of the Bureau of Standards, entitled "United States Government Master Specification for Varnish, Spar Water Resisting," Federal Specifications Board No. 18b.

Any suitable substitute may be employed for the paraffin and petroleum jelly mixture of the waxy character set forth above. Where a mixture of paraffin and petroleum jelly is employed, preferably they are in the proportion of 5 to 7 parts paraffin to 100 parts of petroleum jelly.

The lithographic linseed oil employed is one which has been changed in consistency by the application of heat. A suitable range of consistencies is from 0000 to No. 8, as designated in the trade pertaining to litho-oils.

To this formula I add from 10% to 20% of a suitable formaldehyde solution. I have found that a 30% solution gives satisfactory results but the preferred formula employs a concentrated solution which may be as high as 41%, preferably not less than 40% in as large a quantity as can be taken up by the ink. If an excessive amount of formaldehyde solution is added to the ink, the excess separates out and gives the appearance of a clear fluid floating on the surface of the ink. A small quantity of the solution thus separated does no harm. Having compounded an ink of this character I print directly upon the animal casing in any suitable manner. By this method of application the quantity of formaldehyde entering into the printing of a single casing is negligible. The formaldehyde remains in the ink in an uncombined condition and, of course, most of the formaldehyde used in the ink evaporates as the ink dries, leaving an insignificant quantity of formaldehyde in the casing after the ink is dried.

This ink withstands wetting and processing and is fixed to the surface by the action of the formaldehyde. The characters formed are waterproof, smokeproof and opaque and when hardened by drying do not rub off and are not damaged by stuffing, wetting or curing the sausage.

In its broadest aspect the present invention contemplates the addition of a protein precipitant to any ink formula as a fixative.

I have found in practice that formaldehyde is an effective protein precipitant for this purpose although other protein precipitants may be used. For example, 20% of powdered alum may be substituted for the formaldehyde in the foregoing formula. Similarly, any aldehyde may be used.

The concentration of formaldehyde or other suitable protein precipitant is important in the successful practice of the present invention. A small quantity of formaldehyde or other protein precipitant is insufficient to provide a casing marking ink. For example, I have found that it is desirable to work with the highest possible concentration of formaldehyde in the ink. Starting with a 40% solution of formaldehyde in water and mixing the maximum amount of this solution that can be taken up with the ink, a satisfactory casing ink within the scope of the present invention results. If a substantial amount of formaldehyde escapes from the ink, it is decreasingly unsatisfactory.

I have found in practice that the ink should be applied to the casing in substantial thickness, that is, a quantity greater than is ordinarily applied to such other materials as paper, where other inks are used.

A satisfactory casing ink must be highly waterproof so as to withstand the prolonged soaking to which animal casings are naturally subjected in processing. It is not sufficient, however, that the ink be highly waterproof. It must also be fixed to the casing firmly enough to withstand an appreciable amount of mechanical rubbing to which the casings are naturally subjected in processing and after the finished sausage has been prepared. Ordinary printing inks, for example inks containing waterproof varnish of the type for which a formula is given in this specification are capable of withstanding prolonged soaking, but will not withstand rubbing or other mechanical friction when applied to natural casings.

Natural casings, which are prepared from animal intestines, are peculiarly unprintable with heretofore known inks and by heretofore known methods. Although an ink impression may be made upon a dried natural casing with many ordinary inks, the slippery surface character of the material causes the ink to fall away from the surface upon wetting and handling, there being no absorption of the ink by the tissue.

The ink base employed in the present invention is waterproof, and there is no need of waterproofing by the addition of a protein precipitant, a protein precipitant being employed in the ink of the present invention as a fixative to affix the ink to the casing.

The importance of an adequate quantity of the protein precipitant in the ink of the present invention has been demonstrated by repeated tests. For example, in one test the ink base which has heretofore been described was altered by the addition of varying percentages of formaldehyde. A standard white ink was used and samples of weasands and beef middles printed. Five days after printing the casings were soaked for two hours and forty-five minutes in water at 80° F. The casings were then subjected to a vigorous rubbing between the fingers to determine to what extent the printing ink could be removed from the casing by rubbing with the following results:

| Percent by weight of formaldehyde contained in ink | Observed condition on weasands | Observed conditions on beef middles |
| --- | --- | --- |
| 1 | Ink readily removed by rubbing. | Hard rubbing removes ink. |
| 2 | Light to medium rubbing removes ink. | Hard rubbing necessary to remove ink. |
| 3 | Hard rubbing necessary to remove ink. | Hard rubbing fails to remove ink. |
| 4 | Very hard rubbing necessary to remove ink. | Very satisfactory. |
| 5 | Very satisfactory | Do. |
| 6 | ...do | Do. |
| 7 | ...do | Do. |
| 8 | ...do | Do. |

In the claims, the term "unsaponifiable greasy matter" will be understood to include unsaponifiable waxy matter, unsaponifiable greasy matter, or mixtures of unsaponifiable waxy matter and unsaponifiable greasy matter.

I claim:

1. As a composition of matter, an ink comprising not less than about 50% pigment and not more than about 20% of an approximately 40% formaldehyde solution and the remainder waterproof spar varnish, unsaponifiable greasy matter and litho-oils the formaldehyde remaining in an uncombined condition.

2. As a composition of matter, an ink comprising not less than about 50% pigment and from 10% to 20% of an approximately 40% formaldehyde solution and the remainder waterproof spar varnish, unsaponifiable greasy matter and litho-oils the formaldehyde remaining in an uncombined condition.

3. An ink comprising pigment, waterproof spar varnish, unsaponifiable greasy matter, litho-oils and from 1% to 8% uncombined formaldehyde by weight.

4. A casing ink containing not less than 2% uncombined formaldehyde by weight.

5. A weasand ink containing not less than 3% uncombined formaldehyde by weight.

CHARLES T. WALTER.